United States Patent [19]

Jacob

[11] Patent Number: 5,010,545
[45] Date of Patent: Apr. 23, 1991

[54] ASYNCHRONOUS TIME-DIVISION MULTISERVICE DIGITAL SATELLITE CENTER FOR CONNECTING SUBSCRIBERS

[75] Inventor: Jean-Baptiste Jacob, Saint-Guay-Perros, France

[73] Assignee: Alcatel Cit, Paris, France

[21] Appl. No.: 507,418

[22] Filed: Apr. 10, 1990

[30] Foreign Application Priority Data

Apr. 13, 1989 [FR] France .................. 89 04907

[51] Int. Cl.$^5$ .......................................... H04Q 11/00
[52] U.S. Cl. ...................................... 370/56; 370/91; 370/94.1; 377/55; 235/466
[58] Field of Search .................. 377/55; 235/466; 370/56, 79, 60, 94.1, 91

[56] References Cited

U.S. PATENT DOCUMENTS

| | | | |
|---|---|---|---|
| 3,912,873 | 10/1975 | Skaperda | 370/56 |
| 4,079,240 | 3/1978 | Rynkowski | 377/55 |
| 4,087,681 | 5/1978 | Spencer et al. | 235/466 |
| 4,288,870 | 9/1981 | McDonald et al. | 370/56 |
| 4,689,783 | 8/1987 | Kaczerowski | 370/56 |
| 4,868,812 | 9/1989 | Kruger et al. | 370/56 |
| 4,924,457 | 5/1990 | Shimizu | 370/56 |

FOREIGN PATENT DOCUMENTS 0260676 3/1988 European Pat. Off. .
0289733 11/1988 European Pat. Off. .

OTHER PUBLICATIONS

Computer Networks and ISDN Systems, vol. 11, No. 3, Mar. 1986, pp. 219-241, Elsevier Science Publishers, B.V. (North-Holland), Amsterdam, NL; A. K. Elhakeem et al.: "Analysis of a Hybrid (Demand Assignment TDMA) Protocol for Video Teleconferencing-voice Data Optical Networks".

Electronic Design, Jun. 24, 1982, pp. 73-80, 82, Rochelle Park, US; R. Allan: "PABXs Equip Themselves for the Future Office".

Primary Examiner—Douglas W. Olms
Assistant Examiner—Dang Ton
Attorney, Agent, or Firm—Sughrue, Mion, Zinn Macpeak & Seas

[57] ABSTRACT

The asynchronous time division multiservice satellite center can be used for connecting analog subscribers, digital subscribers, and asynchronous time division digital subscribers. It comprises multiservice concentrators that may be local (CBLA, CBLN, CBLNA, CBLOA), distant (CBEA, CBEN, CBENA, CBEOA), versatile local (CBLM), and versatile distant (CBEM), and a synchronous to asynchronous and asynchronous-to-synchronous converter (CAS), together with a multiservice control unit (UCB) including a multiservice switching network (RCB) and a control station (CS). The multiservice switching network is connected to the multiservice concentrators and to a parent exchange via multiplex links conveying cells, and it provides cell switching. The concentrators connected to analog subscribers or to digital subscribers cellulize and decellulize information therefor.

6 Claims, 3 Drawing Sheets

ASYNCHRONOUS TIME-DIVISION MULTISERVICE DIGITAL SATELLITE CENTER FOR CONNECTING SUBSCRIBERS

The invention relates to connecting analog or digital metal wire subscribers, and to connecting digital optical fiber subscribers, regardless of whether they are close to the parent center or at a distance therefrom, and more particularly it relates to an asynchronous time-division multiservice digital satellite center for connecting subscribers to a telecommunications network.

BACKGROUND OF THE INVENTION

European patent No. 0133703 entitled "Centre Satellite Numérique de Raccordement d'abonnés" (Digital Satellite Center for Connecting Subscribers) describes a connection unit that may be local or remote. In addition, this "versatile" connection unit makes it possible to combine both analog and digital subscribers on concentrators connected to a digital control unit by digital multiplex lines, said concentrators being local or remote.

Such connection units can be used for connecting metal wire subscribers only, i.e. either analog subscribers or 144 Kbit/s digital subscribers using two 64 Kbit/s channels in circuit mode and one 16 Kbit/s channel in frame mode, known to the person skilled in the art as narrow band ISDN 2B+D lines. In addition, the multiplex lines between concentrators and the digital control unit and also between the digital connection unit and the parent center convey all information, i.e. speech, data, and signalling, in synchronous multiplexes, e.g. at 2.408 Mbit/s having 125-microsecond frames with 32 time slots each.

Unfortunately, subscriber needs with new services, such as video services and data services at very high data rates, for example, can no longer be satisfied by the capacities of present subscriber lines, whereas optical fibers are capable of digital data rates that may be as high as 600 Mbit/s or even more.

Asynchronous time division (ATD) makes it possible to multiplex and switch all types of information (speech, images, hi-fi sound, data any data rate, signalling, etc. ..) in a single form of information packet "cell", with cells being fixed in length, and comprising, for example, a 4-byte header portion and a 32-byte information portion. Standardization relating to ATD is currently being performed by the CCITT. Examples of the contents of a header and descriptions of asynchronous time division can be found CCITT recommendation I.121 at paragraphs 3,4.3, et seq, and examples of asynchronous time switching matrices can be found in: ISS 84—Florence, 7-11 May 1984—Session 32C, paper 2, Asynchronous Time-Division Techniques: An experimental packet network integrating video-communications, by A. Thomas, J. P. Coudreuse, and M. Servel; and in ISS 1987—Phoenix, B5 pages 567 to 372 Switching techniques for asynchronous time division multiplexing (or fast package switching) by M. Dieudonné and M. Quinquis.

The object of the invention is to connect different types of subscriber such as analog and digital subscribers on metal wires asynchronous time division (ATD) digital subscribers on metal wires and on optical fibers, and also synchronous subsystems such as private exchanges (PABX) having 2 Mbit/s accesses, for example, and synchronous digital satellite centers, e.g. of the type described in above-mentioned European patent No. 0133703.

SUMMARY OF THE INVENTION

The invention provides an asynchronous time division multiservice digital satellite center for connecting analog and digital subscribers, the center comprising a digital control unit and digital concentrators of at least one of the following types: local, distant, and versatile distant for connecting subscribers over metal wire lines, with the control unit being connected by multiplex links to the concentrators and to a parent digital exchange, wherein the said multiplex links are asynchronous multiplex links conveying cells, wherein the concentrators are multiservice concentrators delivering information received from subscribers in the form of a cells and transmitting information to subscribers taken from the cells they receive, and wherein the digital control unit is a multiservice control unit comprising a multiservice switching network for switching the cells, and connected to the multiservice concentrators and to the parent digital exchange via said asynchronous multiplex links, and a control station connected to the multiservice switching network by controlling asynchronous multiplex links conveying cells.

BRIEF DESCRIPTION OF THE DRAWINGS

An embodiment, of the invention is described by way of example with reference to the accompanying drawings, in which.

DETAILED DESCRIPTION

Figure 1:
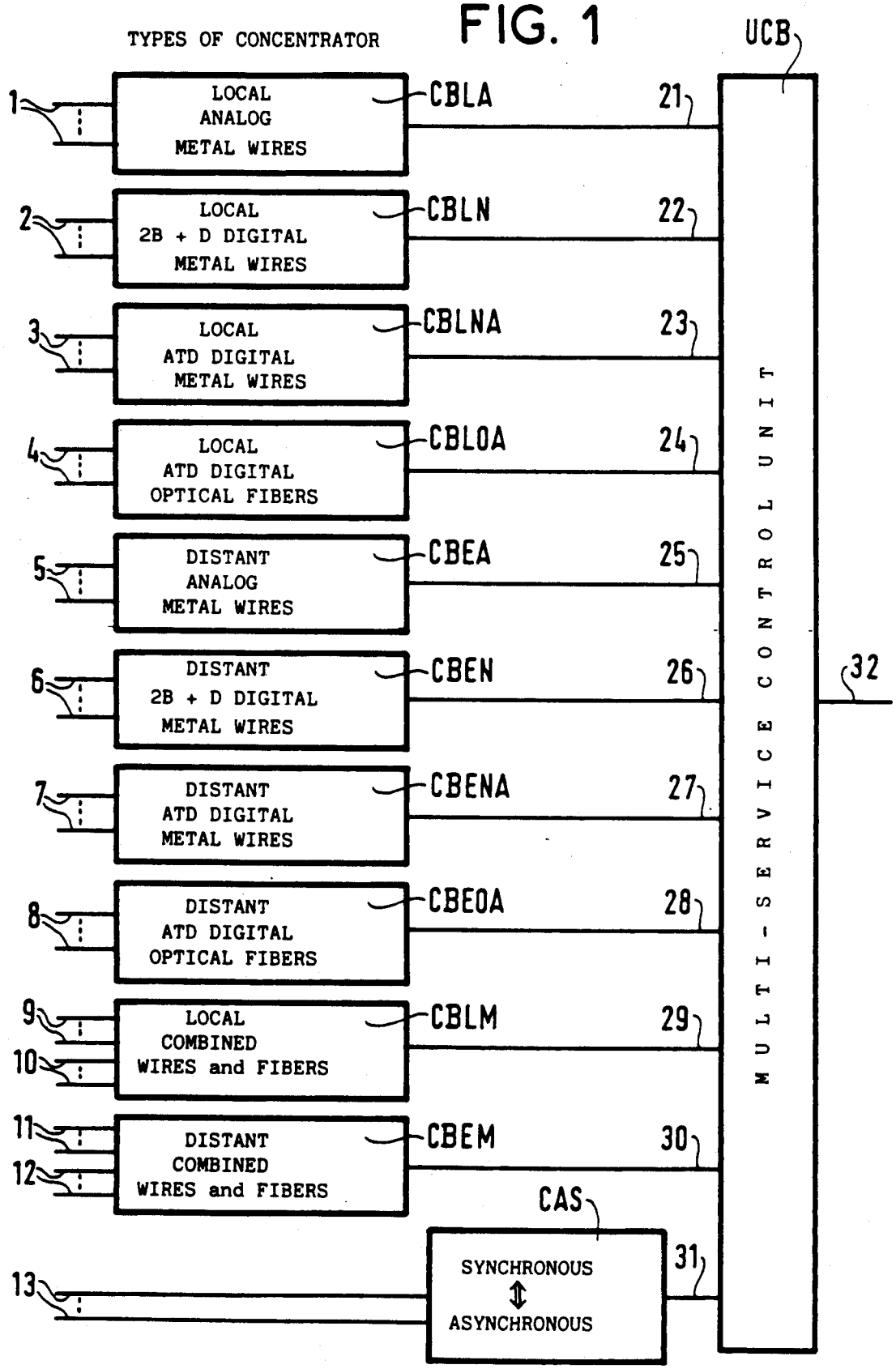
FIG. 1 shows the general architecture of a multiservice digital satellite center of the invention.

FIG. 1 shows the general architecture of a multiservice digital satellite center CSB of the invention constituted by a multiservice control unit UCB and multiservice concentrators of at least one of the following types:

local for analog subscribers on metal wires, CBLA, connected to lines 1;

local for 2B+D digital subscribers on metal wires, CBLN, connected to lines 2;

local for ATD digital subscribers on metal wires, CBLNA, connected to lines 3;

local for ATD digital subscribers on optical fibers, CBLOA, connected to optical fibers 4;

distant for analog subscribers on metal wires, CBEA, connected to lines 5;

distant for 2B+D digital subscribers on metal wires, CBEN, connected to lines 6;

distant for ATD digital subscribers on metal wires, CBENA, connected to lines 7;

distant for ATD digital subscribers on optical fibers, CBEOA, connected to optical fibers 8;

versatile local for analog, 2B+D digital, and ATD digital subscribers on metal wires, and for ATD digital subscribers on optical fibers, CBLM connected to lines 9 and to optical fibers 10;

versatile distant for analog, 2B+D digital, and ATD digital subscribers on metal wires, and for ATD digital subscribers on optical fibers, CBEM, connected to lines 11 and to optical fibers 12; and synchronous-to-asynchronous and asynchronous-to-synchronous converter, CAS, connected to lines 13.

Each concentrator is connected to the multiservice control unit UCB by an ATD multiplex link constituted by at least two two-way multiplex lines having a data rate of 600 Mbit/s, for example, in each direction.

Local multiservice concentrators are situated in the same building as the multiservice control unit UCB. Distant multiservice concentrators are situated at various distances from the multiservice control unit UCB. The converter type concentrators may be either local or distant. Naturally a multiservice digital satellite center CSB may include all the various types of multiservice concentrator or only some of them.

For local type concentrators, the multiplex lines connecting each concentrator to the multiservice control unit UCB are metal wire lines when the concentrators are situated in the immediate proximity of the said control unit, and they are optical fibers when the concentrators are remote from the said control unit. For distant type concentrators, the multiplex lines connecting each concentrator to the control unit are optical fibers.

Each end of each optical fiber two-way multiplex line then includes two opto-electronic components, one for converting optical signals into electrical signals, and the other for converting electrical signals into optical signals.

A local multiservice concentrator CBLA for analog subscribers on metal wires, connects telephone subscribers via subscriber lines 1 and it is itself connected via a multiplex link 21 to the multiservice control unit UCB. A local multiservice concentrator CBLN for 2B+D digital subscribers on metal wires is connected to 144 Kbit/s lines 2, each line being two-way and being connected to a subscriber terminal installation. It is itself connected by a multiplex link 22 to the multiservice control unit UCB.

A local multiservice concentrator CBLNA for ATD digital subscribers on metal wires connects multiservice subscribers on lines 3, each line being connected to a subscriber terminal installation and conveying information cells in both directions with a line data rate of the order of a few Mbit/s, e.g. 2.048 Mbit/s, or else of the order of a hundred or so Kbit/s, e.g. 160 Kbit/s.

It is itself connected to the multiservice control unit UCB via a multiplex link 23.

A local multiservice concentrator CBLOA for subscribers on optical fibers connects multiservice subscribers on optical fiber subscriber lines 4 conveying cells of information coming from or going to a subscriber terminal installation. The line data rate of each optical fiber may be very high, taking values such as 34 Mbit/s, 150 Mbit/s, or 600 Mbit/s. These values are given by way of non-limiting indication. It is itself connected to the multiservice control unit UCB via a multiplex link 24.

The distant multiservice concentrators CBEA, CBEN, CBENA, and CBEOA are respectively identical to the local multiservice local concentrators CBLA, CBLN, CBNA, and CBLOA except insofar as they are themselves located at a distance from the multiservice control unit UCB to which they are connected via respective multiplex links 25, 26, 27, and 28.

A versatile local multiservice concentrator CBLM is connected to metal wire lines 9 and to optical fibers 10 for connecting analog subscribers on metal wires, 2B+D digital subscribers on metal wires, ATD digital subscribers on metal wires, and ATD subscribers on optical fibers, with the line data rates being identical to those mentioned above for corresponding ones of the local multiservice concentrators CBLA, CBLN, CBLNA, and CBLOA. It is itself connected to the multiservice control unit UCB via a multiplex link 29.

A versatile distant multiservice concentrator CBEM is identical to a versatile local multiservice concentrator CBLM except insofar as it is located at a distance from the multiservice control unit UCB to which it is connected via a multiplex link 30.

A synchronous-to-asynchronous and asynchronous-to-synchronous converter CAS is connected by lines 13 to synchronous subsystems such as private branch exchanges (PABX) and synchronous digital satellite centers, with the line data rate being 2.048 Mbit/s. It is connected to the multiservice control unit UCB via a multiplex link 31. This link is a metal wire link when the converter is in the immediate proximity of the control unit and it is an optical fiber link when the converter is distant therefrom. For a distant converter, the link includes opto-electronic components at each end for converting electrical signals into optical signals and vice versa. The converter itself does not form part of the invention and is of any appropriate known type. A suitable converter is described by way of example in Globecom 1985, New Orleans, pp. 791 to 794, Asynchronous Time-Division Networks: Terminal Synchronization for Video and Sound Signals, by J. Y. Cochennec, P. Adam, and T. Houdoin.

The problem of synchronous-to-asynchronous and asynchronous-to-synchronous conversion constitutes the subject matter of paragraph 3.4.3 of above-mentioned CCITT Recommendation I 121.

The multiservice control unit is connected via an optical fiber multiplex link 32 to a multiservice telecommunications exchange.

The data rate of each of the multiplex links 21 to 32 is 600 Mbit/s, for example. As mentioned above, the multiplex links 21 to 24, 29 and 31 are metal wire links or optical fiber links depending on whether the local concentrators are in the immediate proximity of the multiservice control unit, or not. The multiplex links 25 to 28, 30 and 32 are optical fiber links.

Figure 2:
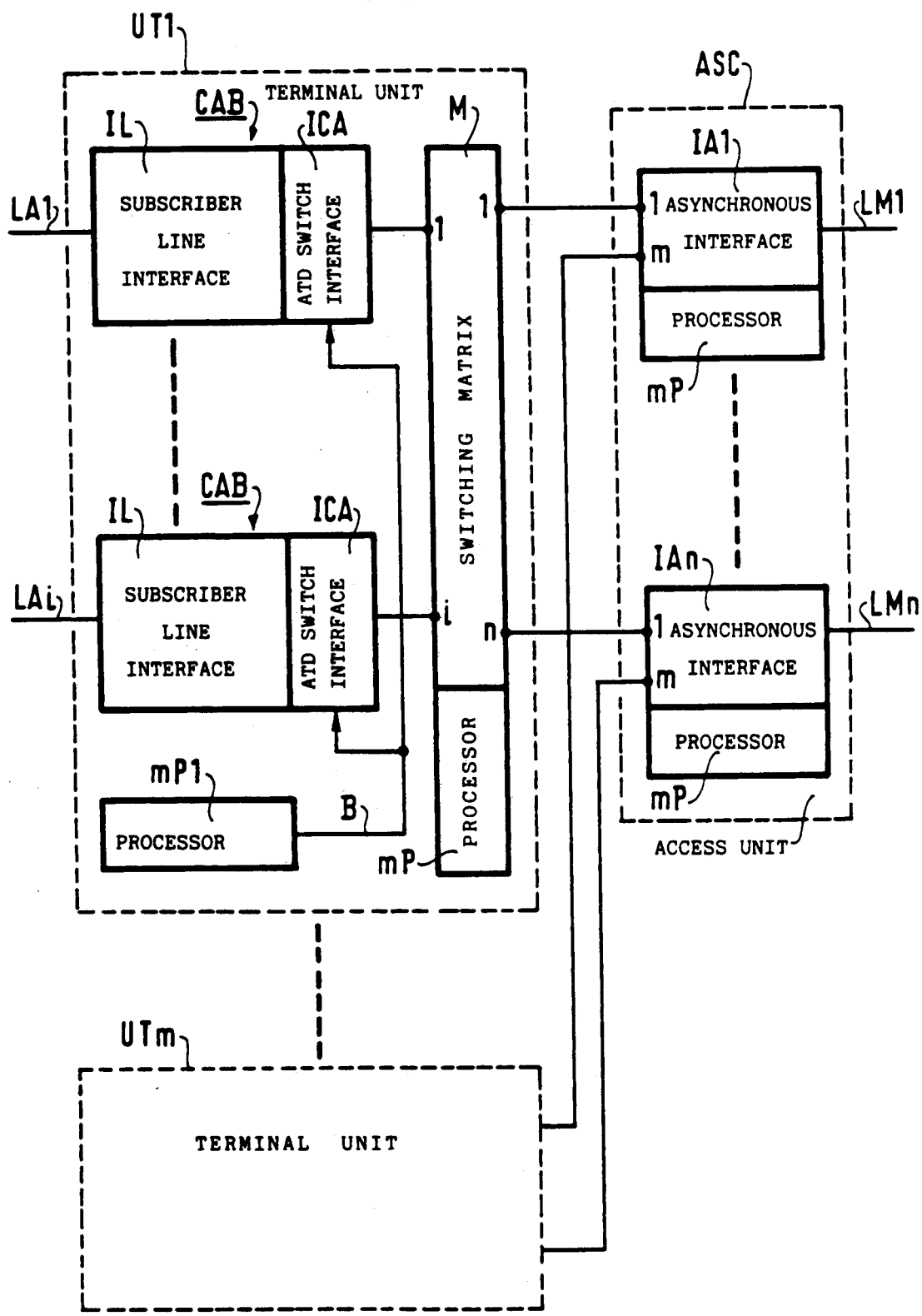
FIG. 2 shows the general architecture of a multiservice concentrator of FIG. 1, regardless of whether it is of the versatile type, or local or remote.

FIG. 2 shows the general architecture of a multiservice concentrator as shown in FIG. 1, regardless of whether it is local, distant, single-purpose or versatile. A concentrator is constituted by an access unit ASC giving access to the multiple link connecting the concentrator to the multiservice control unit, and m terminal units UT1 to UTm, each connected firstly to corresponding subscriber lines LA1 to LAi, and secondly to the access unit ASC.

The access unit ASC is constituted by n asynchronous interfaces IA1 to IAn, where the number n of these interfaces varies as a function of the dimensioning of the concentrator: number of subscribers, types of subscribers, traffic, etc. . . . . For reasons of security and maintaining service, the number of asynchronous interfaces is not less than 2. Each interface is controlled by a microprocessor mP.

Each interface IA1 to IAn is constituted, for example, by a multiplexer/demultiplexer, or by a both-way asynchronous time division switching matrix. Each interface IA1 to IAn is connected to a respective both-way multiplex line LM1 to LMn, with the n multiplex lines from LM1 to LMn constituting the multiplex link connecting the concentrator to the multiservice control unit UCB. As mentioned above, this multiplex link comprises optical fibers when the concentrator is remote from the control unit, in which case each interface IA1 to IAn includes two opto-electric components (not shown) connected to respective ones of the two-way multiplex lines LM1 to LMn in order to convert optical signals into electrical signals and electrical signals into optical signals. Each interface is also connected to each of the m terminal units UT1 to UTm.

A terminal unit UT is constituted by an asynchronous time division switching matrix M having i inlets and n outlets, where n is less than or equal to i, and i subscriber access circuits CAB each connected to a subscriber line. Each of the inlets to the matrix is connected to a subscriber access circuit CAB. The number n of outlets from the matrix is not less than 2, with each outlet being connected to a corresponding one of the interfaces IA1 to IAn. The matrix M conveys calls in both directions and is controlled by a microprocessor mP. Each subscriber access circuit CAB is constituted by a subscriber line interface IL and by an asynchronous time division switching interface ICA.

The asynchronous time division switching interface ICA is connected firstly to one of the inlets to the switching matrix M, and secondly to a bus B of the microprocessor mP1 for controlling and monitoring the subscriber access circuits CAB of the terminal unit.

The composition of the subscriber line interface IL differs depending on whether the subscriber line is a metal wire line for analog subscribers, for 2B+D or ATD digital subscribers, or an optical fiber link for an ATD subscriber.

For an analog line, the subscriber line interface IL comprises, in conventional manner, an interface circuit providing Borscht functions and an analog-to-digital and a digital-to-analog converter providing encoding, decoding, and filtering functions.

For a 2B+D type 144 Kbit/s digital line, the subscriber line interface IL is either an echo cancelling circuit such as described, for example, in Commutation et Transmission, No. 4, 1988, pp. 67 to 83, in "Equipements de Transmission RNIS à 144 Kbit/s de "Deuxième Génération" pour réseau de distribution" ("Second Generation " 144 Kbits/s ISDN Transmission Equipment for Distribution Networks) by F. Marcel, M. Wajih, and R. Cadoret, and in Revue des Télécommunications, Vol. 61, No. 1, 1987, pp. 63 to 71, in "Composants RNIS pour lignes numériques publiques et privées" (ISDN components for public and private digital lines) by P. Van Iseghem, J. M. Danneels, M. C. Rahier, A. Kruger, and K. Szechenyl, or else a circuit transmitting in each direction alternately as described in the above-mentioned article in Commutations et Transmission, No. 4, 1988.

For a metal wire ATD digital line whose data rate is a function of the characteristics of the line, and is about 160 Kbit/s, for example, the line interface IL is likewise either an echo cancelling circuit or else an alternating direction circuit.

For an ATD optical fiber line, the subscriber line interface comprises two opto-electronic components, one converting optical signals into electrical signals, and the other converting electrical signals into optical signals, together with transmit and receive amplifier circuits, and circuits for encoding and decoding signals. For a line having two optical fibers, one for each transmission direction, one of the optical fibers is connected to the opto-electronic receive component and the other optical fiber is connected to the opto-electronic transmit component. When the line has only one optical fiber for both directions of transmission, then the subscriber line interface includes an optical duplexer connected at one end to the optical fiber of the line and at its other end both to the transmit and to the receive opto-electronic components via a transmit fiber and a receive fiber, respectively.

Regardless of the type of subscriber line interface IL, the switching interface ICA comprises circuits for transmitting and extracting signalling cells for call processing, and for operation and maintenance purposes, these cells conveying information between the microprocessor mP1 controlling all of the subscriber access circuits CAB of a terminal unit UT and the multiservice control unit UCB, as well as the subscriber terminal installation on the subscribers premises In addition, with analog subscribers or 2B+D digital subscribers where information is not in the form of asynchronous time cells, the switching interface ICA also performs cellulization and the reverse operation of decellulization, both for signalling messages and for information (speech, images, data) on the 2B+D channels or from the analog-to-digital converter of an analog subscriber line interface IL.

Figure 3:
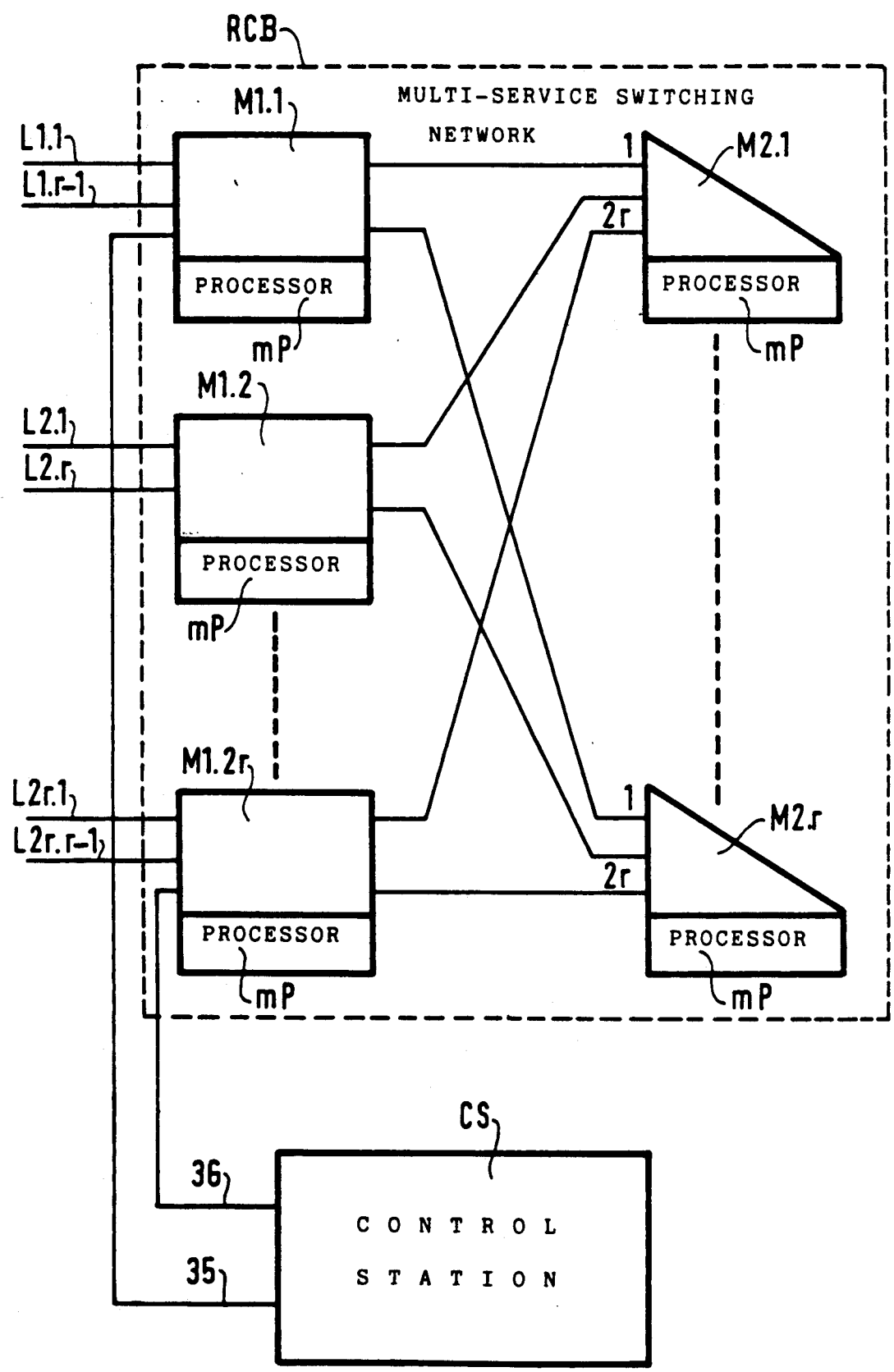
FIG. 3 shows the general architecture of the multiservice control unit of FIG. 1.

FIG. 3 shows the general architecture of a multiservice control unit UCB comprising a control station CS and a multiservice switching network RCB.

The control station CS is constituted by processors and peripherals therefor such as memories, . . . , as required for performing functions such as call processing, operation, and maintenance of a multiservice satellite center. In well known manner, the processors and their peripherals are provided with sufficient redundancy to ensure that service is provided on a permanent basis with the quality required by international standards.

The central switching network RCB is constituted by two stages of asynchronous time division matrices. The matrices of the first stage have r two-way inlets and r two-way outlets, and there are 2r of them reference M1.1, M1.2, . . . , M1.2r. The matrices of the second stage are single-sided matrices constituted by the same matrices as the first stage but folded in such a manner as to constitute matrices having 2r inlets/outlets. There are r matrices in the second stage referenced M2.1 to M2.r, and each matrix is connected to the 2r matrices M1.1 to M1.2r of the first stage by 2r both-way multiplex links.

Each matrix of the first stage and of the second stage is controlled by its own microprocessor mP.

The control station CS is connected via two multiplex links 35 and 36 to two matrices of the first stage. In FIG. 3, multiplex link 35 is connected to the matrix M1.1 and multiplex link 36 is connected to the matrix M1.2r, by way of example.

Each matrix of the first stage is connected by its r both-way inlets to r multiplex lines, with the matrices of the first stage being connected to both-way multiplex lines L1.r to L1.r, L2.1 to L2.r, . . . , L2r.1 to L2r.r. These both-way multiplex lines constitute the multiplex links 21 to 31 of FIG. 1 connecting the multiservice control unit UCB to the various concentrators, and also the multiplex link 32 connecting the multiservice control unit UCB and thus the multiservice digital satellite center CSB to a telecommunications exchange. In FIG. 2 which shows the general architecture of a concentrator, the both-way multiplex lines LM1 to LMn constitute a multiplex link connecting said concentrator to the multiservice control unit UCB shown in FIG. 3. These both-way multiplex lines LM1 to LMn correspond to n both-way multiplex lines taken from the both-way multiplex lines L1.1 to L1.r, L2.1 to L2.r, L2r.1 to L2r.r, of FIG. 3.

As mentioned above, the both-way multiplex lines constituting the multiplex links 32 and the multiplex links 25, 26, 27, 28, and 30 with distant type concentrators are optical fiber links, whereas the both-way multiplex lines 21 to 24, 29 and 31 are either metal wire links or optical fiber links depending on whether the corresponding local type concentrators or converter type concentrators are in the immediate proximity of multiservice control unit UCB, or not. In the switching network RCB, each of the optical fiber both-way lines is connected to a matrix of the first stage by two optoelectronic components (not shown) for converting optical signals into electrical signals and vice versa. When a both-way line is constituted by two optical fibers, one for each transmission direction, one of the fibers is connected in the interface IA of the access unit ASC to an opto-electronic transmit component and in the switching network RCB to an opto-electronic receive component, while the other optical fiber is connected in the interface IA to an opto-electronic receive component and in the switching network to an opto-electronic transmit component. For a both-way line in the multiplex link 32, one of the fibers is connected in the switching network to an opto-electronic transmit component and in the parent exchange to an opto-electronic receive component, while the other optical fiber is connected in the switching network to an opto-electronic receive component and in the parent exchange to an opto-electronic transmit component.

When a both-way multiplexer line is constituted by a single optical fiber for both transmission directions, it is connected at each end to an optical duplexer which is itself connected via one optical fiber to the opto-electronic transmit component and via another optical fiber to the opto-electronic receive component.

Messages are interchanged between the control station CS and each of the microprocessors mP and mP1 of the multiservice digital satellite center, which microprocessors are used for controlling the various matrices and subscriber access circuits of the terminals used, by means of a protocol using the format of asynchronous time division cells interchanged over the multiplex lines between the subscriber access circuits CAB and the terminal unit matrices, between the terminal unit matrices and the matrices of the access unit ASC, and between the access unit matrices and the matrices of the central multiservice switching network RCB. Thus, the control station CS is connected to the central switching network RCB by the two multiplex lines 35 and 36 which are connected to two different matrices of the first stage for reasons of security.

I claim:

1. An asynchronous time division multiservice digital satellite center for connecting analog and digital subscribers, the center comprising a digital control unit and digital concentrators of at least one of the following types: local, distant, and versatile distant for connecting subscribers over metal wire lines, with the digital control unit being connected by multiplex links to the concentrators and to a parent digital exchange, wherein said multiplex links are asynchronous multiplex links conveying information packets designated cells, wherein the concentrators are multiservice concentrators delivering information received from subscribers in the form of the cells and transmitting information to subscribers taken from the cells, and wherein the digital control unit is a multiservice control unit comprising a multiservice switching network for switching the cells, and connected to the multiservice concentrators and to the parent digital exchange via said asynchronous multiplex links, and a control station connected to the multiservice switching network for controlling said cells.

2. A satellite center according to claim 1, also including multiservice concentrators of at least one of the following types: local for metal wire connected asynchronous time division digital subscribers; local for optical fiber connected asynchronous time division digital subscribers; distant for metal wire connected asynchronous time division digital subscribers; distant for optical fiber connected asynchronous time division digital subscribers, and versatile local for optical fiber connected and metal wire connected asynchronous time division digital, synchronous digital, other digital, and analog subscribers.

3. A satellite center according to claim 1, wherein a versatile distant multiservice concentrator is connected to asynchronous time division digital subscribers, to other digital subscribers, and to analog subscribers both over metal wires and over optical fibers.

4. A satellite center according to claim 1, wherein a multiservice concentrator comprises a plurality of terminal units and an access unit; wherein a terminal unit includes: subscriber access circuits each constituted by an asynchronous time division switching interface and by a line interface connected to a subscriber; a switching matrix controlled by a microprocessor for the matrix and connected to the asynchronous time division switching interfaces; and a microprocessor connected to each asynchronous time division switching interface for transmitting and extracting cells relating to signalling signals coming from or going to said microprocessor; and wherein the access unit includes asynchronous interfaces each controlled by a respective microprocessor and connected firstly to the multiservice switching network via an asynchronous multiplex line and secondly to each switching matrix of the terminal unit via respective asynchronous multiplex lines.

5. A satellite center according to claim 1, also including at least one synchronous-to-asynchronous and asynchronous-to-synchronous converter connected firstly to a synchronous multiplex link and secondly to the multiservice switching network via an asynchronous multiplex link.

6. A satellite center according to claim 4, wherein the multiservice switching network is constituted by a first stage of matrices and by a second stage of matrices, wherein each matrix of the first and second stages includes a controlling microprocessor, and wherein the matrices of the first stage are connected to asynchronous multiplex lines in order to connect said first stage to the access units of the terminal units of the multiservice concentrators, to the converters, to the parent digital exchange, and to the control station which is connected to two of the matrices by one multiplex line per matrix.

* * * * *